United States Patent [19]

Walker, Jr.

[11] 4,008,459
[45] Feb. 15, 1977

[54] METHOD OF SEISMIC SURVEYING FOR STRATIGRAPHIC TRAPS

[75] Inventor: Hugh O. Walker, Jr., Houston, Tex.

[73] Assignee: Texaco Inc., New York, N.Y.

[22] Filed: July 18, 1975

[21] Appl. No.: 597,067

[52] U.S. Cl. ............... 340/15.5 CP; 340/15.5 TC; 340/15.5 TG
[51] Int. Cl.² ...................... G01V 1/20; G01V 1/28
[58] Field of Search ........... 340/15.5 CP, 15.5 TC, 340/15.5 MC, 15.5 TG, 7 R

[56] References Cited

UNITED STATES PATENTS

| 3,412,373 | 11/1968 | Ellis | 340/15.5 MC |
| 3,638,176 | 1/1972 | White | 340/15.5 TC |
| 3,681,748 | 8/1972 | Diltz | 340/15.5 TC |
| 3,921,126 | 11/1975 | Waters | 340/15.5 CP |

OTHER PUBLICATIONS

Man, "Seismic Stratigraphic Exploration-Part III", 8/71, pp. 676–689, Geophysics, vol. 36, No. 4.

Adler, "Geophysical Exploration for Stratigraphic Oil Traps", 10/43, pp. 337–347, Geophysics, vol. 8, No. 4.

Primary Examiner—Nelson Moskowitz
Attorney, Agent, or Firm—Carl G. Ries; Thomas H. Whaley; William J. Beard

[57] ABSTRACT

A method for recognizing the presence of and defining the location of a subsurface stratigraphic trap by seismic exploration is disclosed wherein a common depth point seismic source-detector spread is in effect moved along a prospecting line along the surface of the earth. The apparent stacking velocity to a plurality of selected subsurface reflectors is obtained at each common depth point location and is plotted as a function of horizontal distance. Differentials in the stacking velocity plots are compared to provide an estimate of the horizontal location along the survey line of subsurface stratigraphic traps. Additionally, a technique for determining the approximate depth of such traps is disclosed.

7 Claims, 5 Drawing Figures

METHOD OF SEISMIC SURVEYING FOR STRATIGRAPHIC TRAPS

BACKGROUND OF THE INVENTION

This invention relates to the field of seismic exploration for subsurface mineral deposits and more particularly relates to such exploration as related to the location of subsurface stratigraphic traps containing petroleum.

Various techniques have been proposed in the prior art for locating subsurface stratigraphic traps. Stratigraphic traps have become of particular interest in recent times in petroleum prospecting, largely due to the advent of the so-called floating point amplifier seismic recording apparatus. The floating point amplifier enables a very accurate recording of the amplitude of acoustic energy reflected from subsurface acoustic impedance discontinuities at seismic detectors on the surface. Such acoustic impedance discontinuities occur at the boundaries of subsurface layering which have different mechanical properties for the reflection and transmission of acoustic energy. Changes in density, porosity, fluid or gas content or compaction can all lead to various differing travel times for acoustic energy in a subsurface formation.

In the prior art techniques for seismic exploration, stratigraphic traps which can comprise ancient river channels, sand bars, reefs, or the like, have been extremely difficult to locate because the reflection amplitudes and velocities of acoustic energy waves transmitted through these stratigraphic traps may be only slightly different from the surrounding rock layers. These traps may not exhibit characteristic anticlinal or dome structure generally associated with petroleum reservoirs. Such traps can contain enormous quantities, however, of high-grade crude petroleum deposits. The location of such traps is therefore of very high commercial interest to oil prospectors.

Little success has been realized in the prior art due to the fact that the acoustic energy properties of stratigraphic traps can be only slightly different from the properties of surrounding rocks. This, coupled with the almost non-existent structural characteristics of such traps, has made the task of recognizing their existence and determining their location in the subsurface by conventional seismic techniques very difficult. Thus, various attempts to make absolute measurements of the true velocity or true interval travel time, reflected energy amplitude, and/or frequency changes of seismic or acoustic energy associated with the presence of stratigraphic traps have often not been accurate enough to recognize and map stratigraphic traps. The method of the present invention, on the other hand, proposes a technique for locating stratigraphic traps wherein it is not necessary to achieve a high degree of absolute accuracy in the reflected seismic amplitude, velocity, or time measurement. The method of the present invention is based on recognizing the differential change of travel time of acoustic energy propagated through the stratigraphic trap from that propogated through the rock media surrounding the stratigraphic trap. The technique of the present invention, therefore, may be characterized as a differential method as opposed to prior art attempts at absolute measurements of the acoustic properties of subsurface earth formations.

Changes in the acoustic travel time for energy passing through a stratigraphic trap of commercial value and that passing through the surrounding rocks can be as short as 10 milliseconds. To make absolute measurements of time intervals this short on seismic records or record sections, or to make absolute amplitude measurements on reflected energy from the trap and the surrounding rock layers using prior art techniques would be exceedingly difficult with all but perfect seismic data. By observing the differences in apparent average velocity between closely spaced (relative to the lateral dimensions of the trap sought) surface locations in the manner of the present invention, however, changes in travel time on the order of ten milliseconds may be readily recognized using typical quality seismic data. This renders the present technique suitable for the location of stratigraphic traps. The present technique for locating stratigraphic traps has resulted from a study of the problems associated with the so-called velocity anomalies which have heretofore in the art been recognized only as a problem to be overcome in processing seismic data in order to clarify it for further interpretation by geophysicists and geologists in the search for subterranean petroleum deposits.

BRIEF DESCRIPTION OF THE INVENTION

The present invention comprises a method for readily locating stratigraphic traps by the use of differential velocity change measurements. In the method of the present invention, a line of seismic detectors and seismic energy sources are traversed along the surface of the earth at successive locations over a region to be prospected. It will also be appreciated, of course, that the present technique is equally applicable to offshore seismic exploration. At the first location arrays of detectors are located in a first position along the surface of the earth and seismic energy sources are located in a second longitudinally spaced position along the same line on the surface of the earth over the subterranean area being prospected. At the first location of sources and geophones, a vertical apparent velocity profile of the subsurface earth formations is established from the seismic data. The acoustic energy sources and geophones are then moved along the prospecting line in a systematic manner and second geophone and source locations are set up corresponding to the first geophone and source point locations. At each such relocation of source and geophones, a velocity profile of the subsurface earth formations is determined. This process is repeated until the entire line to be surveyed has been accomplished. By then observing the changes or differentials in the apparent average velocity (called stacking velocity) at each source-detector location of the same subsurface reflector, any anomalous or apparently anomalous velocity changes to this reflector may be interpreted in terms of subsurface stratigraphic traps.

The invention is described with more particularity in the appended claims. The invention is best understood by reference to the following detailed description thereof when taken in conjunction with the accompanying drawings.

DESCRIPTION OF THE PREFERRED EMBODIMENT

In the prior art so-called acoustic velocity anomalies which are used to detect the existence and location of stratigraphic traps according to the techniques of the present invention have been viewed as a problem. It has long been recognized that "anomalous velocities" were desirable to eliminate in order to enhance further processing of seismic data. For example, in a paper entitled "Developments in Seismic Data Processing and Analysis" by W. A. Schneider, GEOPHYSICS, Vol. 36, No. 6, December 1971, pp. 1043–1073, a technique for overcoming so-called velocity anomalies is described. This paper treats such anomalies as a problem to be eliminated in the processing of seismic data. The present invention, on the other hand, employs the concept of searching for just such stacking velocity "anomalies" or differential apparent velocity changes, as a seismic source-detector spread traverses a line over a subterranean area to be explored for stratigraphic traps.

The present invention is particularly useful in connection with the common depth point (CDP) method of seismic exploration because the field techniques for acquiring the seismic data, on land or in offshore areas, and the techniques for organizing and analyzing the field records have been highly developed to facilitate the extraction of useful information about the subsurface from the field data in an efficient and economic manner. In addition, due to the widespread familiarity with the CDP method, the present invention will be described with reference to certain techniques of the CDP method so that the concepts of the present invention can be most easily understood by those skilled in the art. However, it will be obvious to those skilled in the art that the same useful results can be obtained with the present invention using other field techniques and using other procedures for extracting the desired subsurface information from seismic data.

In the most general terms, the present invention can be practiced by first collecting CDP field records along a line of profile incorporating, according to this invention, a predetermined set of parameters to opitimize the source-detector array geometry, and common depth point spacing along the line of profile. Secondly, organizing the traces of the field records in the form of conventional CDP gather records so that the stacking velocity of each reflection on each gather record can be determined using almost any of the conventional CDP curve fitting procedures at each common depth point location along the line of profile. Thirdly, constructing a display of the stacking velocities (measured as a function of time) along the line of profile in such a manner that the presence of a stratigraphic trap or velocity anomaly in the subsurface can be easily recognized and its depth and lateral dimensions can be defined.

Figure 1:
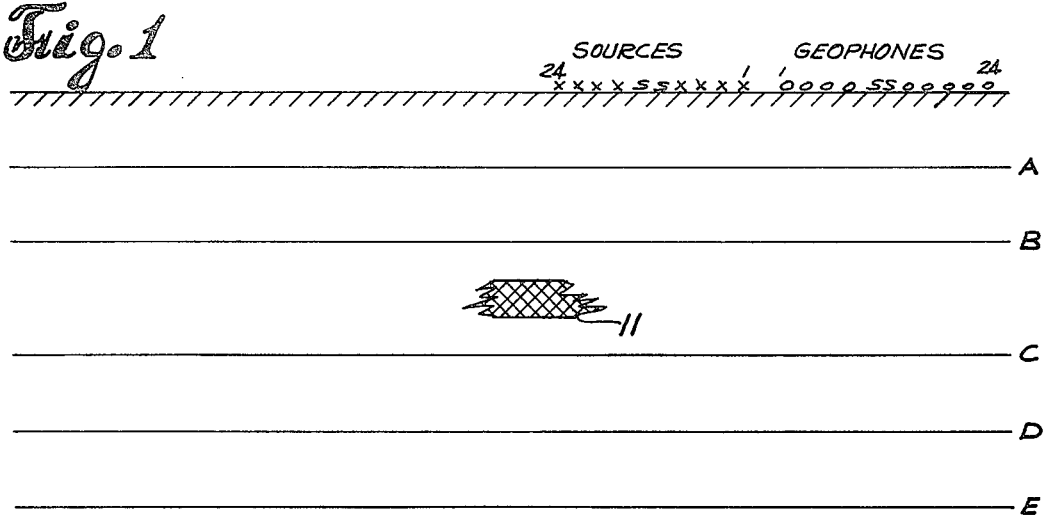
FIG. 1 is a schematic illustration showing one arrangement of seismic energy sources and seismic energy detectors employed at a first location at the beginning of a line of exploration on the surface of the earth which traverses a subterranean stratigraphic trap to be located.

The method of the present invention can best be described in terms of an example utilizing seismic data acquired with the field procedures commonly used with the common depth point method. Any other filed procedure which produces reflection travel reflection times as a function of source detector spacing and hence affords the opportunity to measure apparent velocity, are equally adequate for the present invention. Referring initially to FIG. 1, a 24-fold redundant common depth point arrangement of seismic source and geophone arrays (i.e., 24 of each) is illustrated schematically at the surface of the earth (or water, in offshore exploration) overlying a layered subterranean region containing a stratigraphic trap 11. The stratigraphic trap 11 is embedded in a surrounding rock layer between subterranean interfaces B and C which represent acoustic impedance discontinuities at the boundaries of subsurface layers. Several such boundaries are illustrated in FIG. 1 and are labeled A, B, C, D, and E.

It will be recognized by those skilled in the art that 6, 12, or 24-fold redundant common depth point data can be typically employed in subsurface seismic exploration. The illustration in FIG. 1 shows a 24-fold redundant configuration, but for terms of simplicity and clarification, the method of the present invention can be thought of as being operable with lesser redundancies of common depth point data. In the subsequent descriptions of the method of the invention the use of 6-fold redundant common depth point data will be discussed.

In the arrangement of FIG. 1, acoustic energy reflections from subsurface acoustic impedance boundaries A, B, C, D, and E are recorded on detector 1 from source location 1. Following this a source at location 2 is energized and recordings made at detector 2. This sequence is continued and typically either 6, 12 or 24 traces which are designated as a common depth point (this point being the centerline between each corresponding source and detector) record of seismic data, from the source detector spread illustrated on the surface in FIG. 1 is obtained. The recording is made at each detector as a function of time of the amplitude of the reflected acoustic energy.

Figure 2:
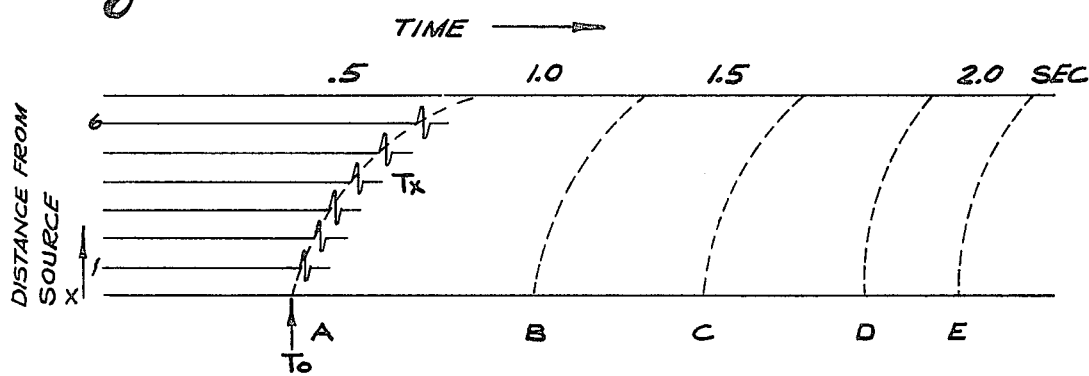
FIG. 2 illustrates a seismic trace time record such as might be gathered at the first location of the acoustic energy source and acoustic energy detector line of FIG. 1.

In FIG. 2, detector 1 is located nearest the shot point for acoustic energy source 1 while detector 6 is the most remote detector from the shot point 6. The travel time of acoustic energy reflected at interface A for a detector at zero distance from its source is labeled $T_o$ in FIG. 2. It will be noted that the amplitude variations of the first arrivals of reflected acoustic energy corresponding to the reflection of the energy from subsurface interface A arrive at each of the detectors at different times due to their different distances from the source of acoustic energy.

It may generally be shown that these arrivals from particular subsurface reflectors fall generally along hyperbolic curves whose equation may be given (using the CDP technique) by Equation (1):

$$T_x = \left[ T_o^2 + \frac{x^2}{v^2} \right]^{1/2} \quad (1)$$

where $T_x$ is the arrival time at a detector located a distance $x$ from the shot source and v is the apparent or "stacking" velocity of the subsurface material in the travel path of the acoustic energy. In FIG. 2, it will be noted that generally the curves for the arrival times of acoustic energy from particular subsurface reflectors such as B, C, D, and E all fall along hyperbolic shaped curves of this general form. The stacking velocity or apparent average velocity of acoustic waves from the source to the detectors may thus be obtained by finding the value of v which yields the best curve fit of Equation 1 to the different travel times and corresponding different distances of the detectors. Standard curve fitting procedures may be used.

Thus, with the source-detector array (commonly referred to as a "spread") located at the location of FIG. 1, initially, each of the sources is activated and a trace recording such as that of FIG. 2 is obtained. preferrably the spread length should be about twice the width of any expected subsurface anomaly. When this has been accomplished, the entire source detector array is moved a slight distance (on the order of 1/10 the width of the expected anomaly size) to the left on FIG. 1 and the entire sequence repeated. A record of the seismic data taken at two such different spread locations is illustrated in FIG. 3.

Figure 3:
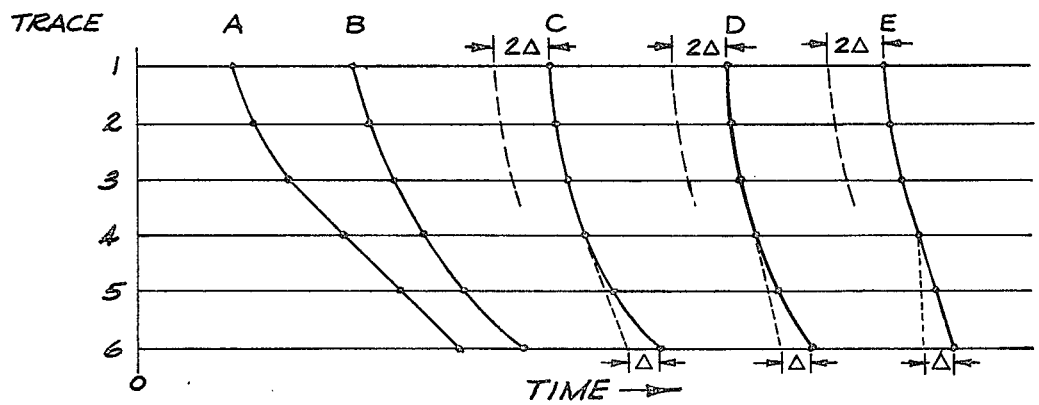
FIG. 3 illustrates a trace record similar to that of FIG. 2 except that superimposed upon the record in FIG. 3 are traces from two adjacent acoustic energy source and detector array locations.

In FIG. 3, the solid lines are drawn through the dots on each seismic trace (corresponding to the reflector arrivals as illustrated by the amplitude variations of FIG. 2) and illustrate the loci of arrival times for reflection from reflectors A–E shown in FIG. 1 with the sources and geophones located in the position of FIG. 1 to the right of the stratigraphic trap 11. However, also superimposed in the illustration of FIG. 3 and illustrated by the dotted line curves is another such record which is recorded with the source-detector spread relocated at a short distance to the left of the initial location. It will be appreciated by those skilled in the art that the movement between each sequence of source detector locations may be made as desired. However, for purposes of common depth point shooting, this distance may conveniently be taken to be on the order of the distance between adjacent geophone groups in FIG. 1.

In moving the sources and detectors from right to left as described and recording seismic records at each location, the seismic energy traveling from the surface and back from reflectors A and B will have been unaffected by the stratigraphic trap 11 of FIG. 1. However, seismic energy traveling down and back to reflectors C, D, and E is affected as shown in FIG. 3 by the dotted lines. In this instance, it is assumed that the acoustic energy travels through the stratigraphic trap in a time $\Delta$ less than the time through the surrounding rocks. The traveling times for events A and B do not change since they are located above the stratigraphic trap in FIG. 1.

When the source to geophone arrangement is located in such a manner that the energy from the acoustic sources on the right to the geophones on the left traverses a stratigraphic trap, once going down to reflectors C, D, and E and once coming back, then these traces will be shifted by time $2\Delta$ as shown by the dashed line in FIG. 3. Traces recorded from source geophone pairs with a large separation such as 24, 23, and 22 of FIG. 1 will be relatively unaffected for this latter position of sources and geophones.

When the above described seismic recording procedure has been accomplished usually a general purpose digital computer processing technique may be applied to measure the stacking velocity as defined in Equation 1 by the loci of travel times illustrated in FIG. 3. The stacking velocities measured in this manner will be found to exhibit changes which can be used to indicate the width and position of the subsurface stratigraphic trap 11 of FIG. 1.

Figure 4:
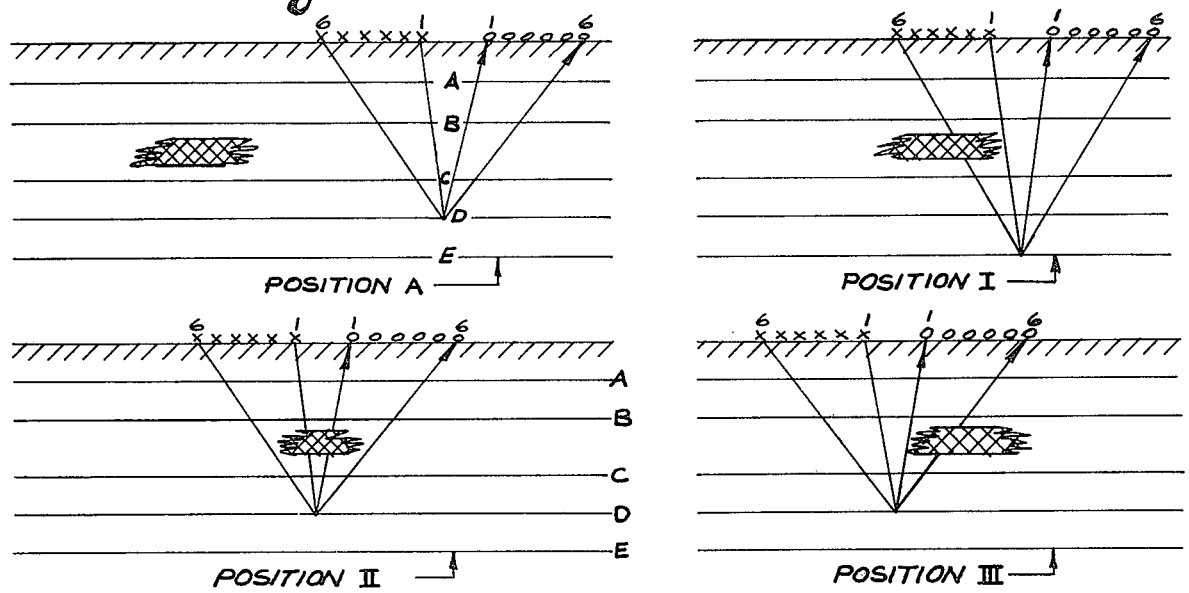
FIG. 4 illustrates the movement of sources and detector arrays along a survey line traversing a subterranean stratigraphic trap to be located in accordance with the techniques of the present invention.

Referring now to FIG. 4, the nature of the changes (or differentials) in the stacking velocities measured at three locations, I, II and III which traverse a stratigraphic trap are shown as an example. It will be noted, of course, that in FIG. 4 only six source detector locations are considered. Position A illustrates the source detector spread not traversing any portion of the trap.

In position I, the sources and geophones are so located that energy travels through the stratigraphic trap for only the more distance sources and detectors since only the distant sources are located over the trap in this position. In position II, essentially only acoustic energy traveling down and back from the closest spaced sources the detectors passes through the trap. In position III, the spread has effectively traversed most of the trap and again, only the energy from longer range source detector pairs passes through the subsurface stratigraphic trap since now only the remote detectors are over the trap.

For sources and geophone locations to the right of the subsurface stratigraphic 11 of FIG. 1 (i.e., position A in FIG. 4), the locus of travel times are unaffected by the subsurface stratigraphic trap. The stacking velocities of each of the reflectors A, B, C, D, and E are measured in an unaffected manner.

At position I of FIG. 4, the reflections will arrive $\Delta$ earlier (for the type of velocity for the stratigraphic trap under consideration) for events C, D, and E on the long range traces as indicated by the dotted lines in FIG. 3. At position II, reflections from C, D and E will arrive $2\Delta$ earlier on the near range traces as indicated by the dashed lines in FIG. 3. Finally, at position III, the arrival times will be the same as at position I. When the sources and geophones have been repositioned to the extreme left of the velocity anomaly, the loci of travel times will be the same as illustrated in position A (i.e., unaffected by the trap).

Figure 5:
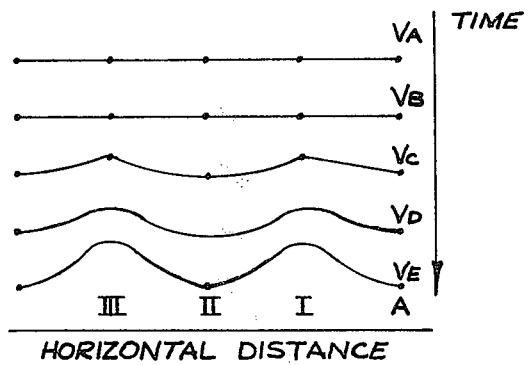
FIG. 5 illustrates a stacking velocity versus horizontal distance display for a plurality of source detector locations corresponding to those of FIG. 4 in accordance with the concepts of the present invention.

Referring now to FIG. 5, measurements of the stacking velocities as a function of horizontal distance as obtained for the events corresponding on the seismic records to reflectors A, B, C, D, and E are plotted. It will be recalled that these stacking velocities may be obtained by computer processing the data according to Equation 1 and obtaining the apparent average velocity of the reflection events therefrom. It will be noted in FIG. 5 that the velocities for reflections from interfaces A and B are substantially the same at all positions. Stacking velocities for reflections C, D and E will increase at position I, decrease at position II and increase again at position III. These changes will be larger on the deeper (or later time) occurring reflections. At other positions intermediate of positions described with respect to FIG. 4, the stacking velocity computations will plot along the curves drawn through the dots of FIG. 5.

By observing the stacking velocity displays as a function of distance as illustrated in FIG. 5, the geophysicist or geologist can locate the horizontal position of the subsurface stratigraphic trap due to the change in stacking velocities or differential stacking velocities as the source detector spread moves across its subsurface location. Additionally, the approximate depth of the stratigraphic trap may be determined by multiplying the apparent stacking velocity by the time of arrival of a particular reflection from a subsurface reflector. In this manner, stratigraphic traps may be located as long as the one-way differential travel times from the source detector spread vary on the order of 10 milliseconds variation as the source-detector spread locations traverses the subsurface stratigraphic trap.

Summarizing the technique of the present invention is as follows:

1. Arrange a seismic source and detector spread preferably, at least two times the longitudinal extent of any expected subsurface anomaly, at a first location along a line to be surveyed, preferably with detector and source spacings on the order of at least 1/10 the size of any expected subsurface anomaly.

2. At this source-detector location impart from a plurality of source locations seismic energy to the subsurface earth formations and record at the detectors signals representative of the amplitudes of the reflections of acoustic energy from subsurface acoustic impedance discontinuities.

3. Move the source detector spread a predetermined distance along the line to be traversed and repeat (2). Continue this process until the entire line of exploration is traversed.

4. At each source detector spread location determine the apparent stacking velocity (i.e., the apparent velocity to common reflectors from a plurality of selected subsurface seismic reflectors).

5. Plot the stacking velocities as a function of horizontal distance for each of the chosen reflectors. Note that steps (4) and (5) may be performed in real time as the data is gathered or may be performed later at a central data processing location.

6. Compare the differential in stacking velocities to each selected subsurface reflector to observe the horizontal location of a stratigraphic trap traversed by the line of exploration.

7. Determine the apparent depth of the trap by multiplying the apparent stacking velocity by the time of arrival of a reflection event.

It will be appreciated by those skilled in the art that the foregoing description may make other alternative techniques which are deemed to be within the scope of the invention apparent to those of ordinary skill in the art. It is the aim of the appended claims to cover all such obvious changes and modification as fall within the true spirit and scope of the invention.

I claim:

1. A method of seismic prospecting for stratigraphic traps of expected horizontal extent in subterranean earth formations comprising the steps of:

a. arranging a seismic source detector spread comprising a plurality of seismic energy sources and a plurality of seismic detectors having a horizontal extent approximately at least twice the expected horizontal extent of any subsurface feature being prospected for at a first source detector spread location along a line traversing a subterranean region to be prospected;

b. imparting from seismic energy sources at said first spread location, acoustic energy which travels generally downwardly and outwardly from said source into the subterranean region to be prospected;

c. recording as a function of time signals representative of the amplitudes of reflected seismic energy at said detector locations in the spread;

d. determining the apparent stacking velocity of seismic energy from a plurality of selected subsurface reflectors at each such impartation of seismic energy by said seismic energy sources;

e. moving said source detector spread location a predetermined horizontal distance approximately 1/10 the expected horizontal extent of any subsurface feature being prospected for along said traversing line and repeating steps (b), (c) and (d) at each such new location; and f. comparing said apparent stacking velocities at each such source detector spread location, by graphically plotting the apparent stacking velocity at each source detector spread location to each selected subsurface reflector as a function of horizontal distance along said traversing line, to observe any differential present in said stacking velocities to each of said selected reflectors as a function of horizontal distance, thereby obtaining the approximately horizontal distance location along said traversing line of any stratigraphic traps in said subterranean region being prospected.

2. The method of claim 1 and further including the step of obtaining the approximate depth of the stratigraphic trap traversed by said traversing line by multiplying the time of occurrence of any stacking velocity differential occurrence so observed by the apparent stacking velocity at the location of said differential.

3. The method of claim 1 wherein the step of imparting from each seismic energy source, acoustic energy which generally travels downwardly and outwardly from said source, is performed by so doing in a repetitive manner at each such source location.

4. The method of claim 1 wherein said seismic source detector spread comprises at least a six fold common depth point source detector array.

5. The method of claim 1 wherein said seismic source detector spread comprises at least a 12-fold common depth point source detector array.

6. The method of claim 1 wherein said seismic source detector spread comprises at least a 24-fold common depth point source detector array.

7. The method of claim 1 wherein the recording step is performed by digitally sampling the amplitude of reflected seismic energy at each detector as a function of time at a predetermined and recording said digital samples as a function of time.

\* \* \* \* \*